Aug. 18, 1931.   G. R. METCALF, JR   1,819,653
CONNECTER FITTING
Original Filed Aug. 6, 1928

George R. Metcalf Jr
INVENTOR.

BY
ATTORNEYS.

Patented Aug. 18, 1931

1,819,653

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONNECTER FITTING

Application filed August 6, 1928, Serial No. 297,803. Renewed April 27, 1931.

The present invention is designed to improve connecter fittings and is particularly designed to provide a means for connecting a threadless conduit with a knock-out box. Features and details of the invention will appear from the specification and claims.

A preferred embodiment of the invention is illustrated in the accompanying drawings as follows:—

Figure 1:
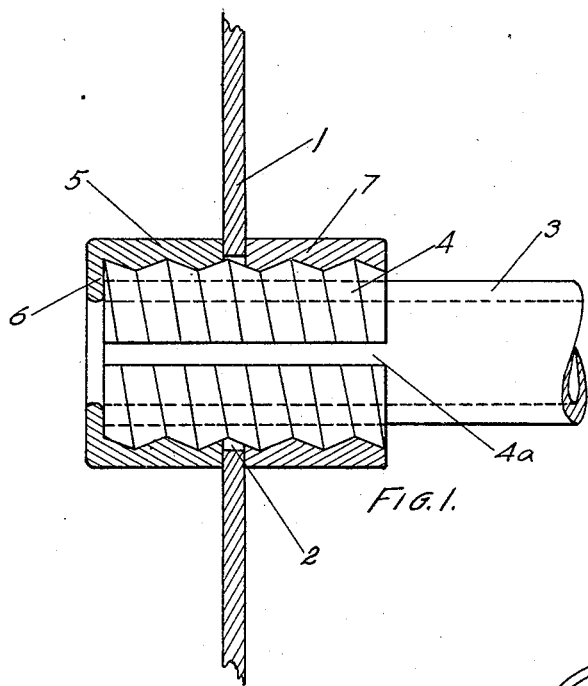

Fig. 1 shows a central section through a fitting in place in a knock-out box.

Figure 2:
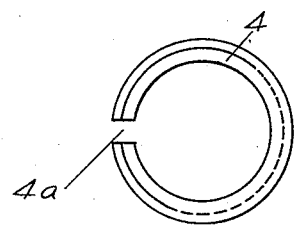

Fig. 2 an end view of the contracting tube of the fitting.

1 marks the knock-out box wall. This is provided with the usual opening 2.

A conduit 3 extends into, or through this opening. A contractible tube 4 is arranged around the conduit. This tube is screw-threaded, the screw threads extending continuously from end to end of the sleeve, said screw threads being inclined in both directions, the inclination to the axis of the tube being less than the inclination to a line perpendicular to that axis. The tube is rendered contractible by a slot 4a which extends axially through the tube.

A sleeve 5 is interiorally screw-threaded and operates on the threads of the tube 4. It has an inner guard lip 6 which is adapted to extend over the end of the inserted conduit. An outer sleeve 7 is provided with an interior screw thread adapted to engage the threads on the tube 4 and this sleeve is screwed on to the tube 4.

In assembling the fitting the sleeve 5 is ordinarily screwed on to the tube 4 and the tube extended through the opening 2. The sleeve 7 is then screwed on to the outer end of the tube 4 and as the sleeve is set up the two sleeves 5 and 7 clamping the wall between them and thus fix or lock the fitting in the opening 2 and in engagement with the wall of the knock-out box. This setting up action also operates to contract the tube, the wedging engagement of the threads with their inclined faces accomplishing this result.

This makes a particularly rigid construction, one of simple construction, and one in which the pull on the conduit tends to more firmly clamp the conduit through the wedging action of the tube in the sleeve 5.

What I claim as new is:—

1. In a connecter fitting, the combination of a wall having an opening therethrough; a contractible tube slotted and exteriorly screw-threaded arranged in the opening; an interiorly threaded sleeve on the inner end of the tube; and an interiorly threaded sleeve on the outer end of the tube, the slope of a thread of each sleeve being inclined to form wedging surfaces, the inclination being less relatively to the axis than to a perpendicular to the axis and engaging a similar slope on the contractible tube and, said sleeves clamping the wall between them and contracting the tube through the wedging action of the threads of both sleeves.

2. In a connecter fitting, the combination of a wall having an opening therethrough; a contractible tube slotted and exteriorly screw-threaded arranged in the opening, the screw threads being similar and continuous throughout the length of the tube; an interiorly threaded sleeve on the inner end of the tube; and an interiorly threaded sleeve on the outer end of the tube, the inclination of the slopes of said threads to the axis being less than the inclination to a perpendicular to the axis and, said sleeves clamping the wall between them and contracting the tube through the wedging action of the threads of both sleeves.

3. In a connecter fitting, the combination of a wall having an opening therethrough; a contractible tube slotted and exteriorly screw-threaded arranged in the opening, the screw threads being inclined in both directions; an interiorly threaded sleeve on the inner end of the tube; and an interiorly threaded sleeve on the outer end of the tube, the inclination of the slopes of said threads to the axis being less than the inclination to a perpendicular to the axis and, said sleeves clamping the wall between them and contracting the tube through the wedging action of the threads of both sleeves.

4. In a connecter fitting, the combination of a wall having an opening therethrough; a contractible tube slotted and exteriorly screw-threaded arranged in the opening, the screw threads being inclined in both directions, the inclination to the axis being less than the inclination to a perpendicular to the axis; an interiorly threaded sleeve on the inner end of the tube; and an interiorly threaded sleeve on the outer end of the tube, said sleeves clamping the wall between them and contracting the tube through the wedging action of the threads of both sleeves.

5. In a connecter fitting, the combination of a wall having an opening therethrough; a contractible tube slotted and exteriorly screw-threaded arranged in the opening; an interiorly threaded sleeve on the inner end of the tube; an interiorly threaded sleeve on the outer end of the tube, the slope of a thread of each sleeve being inclined to form wedging surfaces, the inclination being less relatively to the axis than to a perpendicular to the axis and engaging a similar slope on the contractible tube and, said sleeves clamping the wall between them and contracting the tube through the wedging action of the threads of both sleeves; and a guard arranged on the inner end of the inner sleeve.

In testimony whereof I have hereunto set my hand.

GEORGE R. METCALF, Jr.